United States Patent
Kravec et al.

(10) Patent No.: US 7,366,352 B2
(45) Date of Patent: Apr. 29, 2008

(54) METHOD AND APPARATUS FOR PERFORMING FAST CLOSEST MATCH IN PATTERN RECOGNITION

(75) Inventors: Kerry A. Kravec, Bethel Park, PA (US); Ali G. Saidi, Austin, TX (US); Jan M. Slyfield, San Jose, CA (US); Pascal R. Tannhof, Fontainebleau (FR)

(73) Assignee: International Business Machines Corporation, Armonk, NY (US)

( * ) Notice: Subject to any disclaimer, the term of this patent is extended or adjusted under 35 U.S.C. 154(b) by 904 days.

(21) Appl. No.: 10/393,146

(22) Filed: Mar. 20, 2003

(65) Prior Publication Data
US 2004/0184662 A1 Sep. 23, 2004

(51) Int. Cl.
*G06K 9/62* (2006.01)

(52) U.S. Cl. ............ 382/225; 382/304; 712/212; 704/231

(58) Field of Classification Search ............ 382/225
See application file for complete search history.

(56) References Cited

U.S. PATENT DOCUMENTS

| | | | | |
|---|---|---|---|---|
| 3,916,100 A | * | 10/1975 | Azuma | 341/5 |
| 4,075,688 A | * | 2/1978 | Lynch et al. | 711/200 |
| 4,145,738 A | * | 3/1979 | Inoue et al. | 711/209 |
| 4,493,034 A | * | 1/1985 | Angelle et al. | 713/100 |
| 4,500,776 A | * | 2/1985 | Laser | 235/462.27 |
| 4,555,796 A | * | 11/1985 | Sakoe | 704/241 |
| 4,641,276 A | * | 2/1987 | Dunki-Jacobs | 710/71 |
| 4,674,033 A | * | 6/1987 | Miller | 711/151 |
| 4,754,490 A | * | 6/1988 | Swonger | 382/170 |
| 4,779,210 A | * | 10/1988 | Katsura et al. | 345/501 |
| 4,901,352 A | * | 2/1990 | Watari | 704/238 |
| 5,060,277 A | * | 10/1991 | Bokser | 382/160 |
| 5,070,478 A | * | 12/1991 | Abbott | 715/531 |
| 5,075,896 A | * | 12/1991 | Wilcox et al. | 382/225 |
| 5,086,479 A | | 2/1992 | Takenaga et al. | 382/14 |
| 5,123,015 A | * | 6/1992 | Brady et al. | 370/539 |
| 5,127,055 A | * | 6/1992 | Larkey | 704/244 |
| 5,161,204 A | * | 11/1992 | Hutcheson et al. | 382/157 |
| 5,230,045 A | * | 7/1993 | Sindhu | 711/203 |
| 5,233,694 A | * | 8/1993 | Hotta et al. | 712/215 |
| 5,263,097 A | * | 11/1993 | Katz et al. | 382/190 |
| 5,295,197 A | | 3/1994 | Takenaga et al. | 382/14 |
| 5,375,175 A | * | 12/1994 | Kino et al. | 382/145 |
| 5,384,722 A | * | 1/1995 | Dulong | 708/201 |

(Continued)

*Primary Examiner*—Matthew C. Bella
*Assistant Examiner*—Sath V. Perungavoor
(74) *Attorney, Agent, or Firm*—Joscelyn G. Cockburn; Winstead PC

(57) ABSTRACT

A method and apparatus for determining a closest match of N input patterns relative to R reference patterns using K processing units. Each of a set of input patterns are loaded into the K processing units. One of the Reference patterns is sequentially loaded into each of the processing units and a distance defining the similarity between the reference pattern and each of the input patterns is calculated. A present calculated distance replaces its corresponding stored present minimum distance if it is has a smaller value. After the R reference patterns have been processed the minimum distance and its corresponding identification for all N input patterns is determined without merging outputs. The minimum distances and the identifications may be read either in parallel or serially. The apparatus is easily scalable by adding processors. The number of reference patterns may be easily increased without altering system configuration.

4 Claims, 8 Drawing Sheets

U.S. PATENT DOCUMENTS

| | | | | | |
|---|---|---|---|---|---|
| 5,394,532 | A | * | 2/1995 | Belsan | 711/114 |
| 5,408,625 | A | * | 4/1995 | Narita et al. | 712/210 |
| 5,438,630 | A | * | 8/1995 | Chen et al. | 382/159 |
| 5,459,798 | A | * | 10/1995 | Bailey et al. | 382/218 |
| 5,473,731 | A | * | 12/1995 | Seligson | 706/28 |
| 5,475,770 | A | * | 12/1995 | Mittelbach et al. | 382/181 |
| 5,519,789 | A | * | 5/1996 | Etoh | 382/225 |
| 5,524,065 | A | * | 6/1996 | Yagasaki | 382/226 |
| 5,550,931 | A | * | 8/1996 | Bellegarda et al. | 382/187 |
| 5,560,039 | A | * | 9/1996 | Dulong | 712/24 |
| 5,602,938 | A | * | 2/1997 | Akiyama et al. | 382/155 |
| 5,621,863 | A | * | 4/1997 | Boulet et al. | 706/26 |
| 5,701,397 | A | * | 12/1997 | Steimle et al. | 706/41 |
| 5,710,869 | A | * | 1/1998 | Godefroy et al. | 706/41 |
| 5,715,175 | A | * | 2/1998 | Herluison | 708/203 |
| 5,715,436 | A | * | 2/1998 | Kawai et al. | 345/505 |
| 5,717,832 | A | * | 2/1998 | Steimle et al. | 706/33 |
| 5,717,908 | A | * | 2/1998 | Dulong | 712/221 |
| 5,732,394 | A | * | 3/1998 | Nakadai et al. | 704/255 |
| 5,740,326 | A | * | 4/1998 | Boulet et al. | 706/27 |
| 5,745,733 | A | * | 4/1998 | Robinson | 710/71 |
| 5,757,409 | A | * | 5/1998 | Okamoto et al. | 347/230 |
| 5,809,273 | A | * | 9/1998 | Favor et al. | 712/210 |
| 5,825,921 | A | * | 10/1998 | Dulong | 382/181 |
| 5,842,162 | A | * | 11/1998 | Fineberg | 704/233 |
| 5,852,729 | A | * | 12/1998 | Limberis et al. | 712/225 |
| 5,854,855 | A | * | 12/1998 | Errico et al. | 382/187 |
| 5,864,867 | A | * | 1/1999 | Krusche et al. | 707/104.1 |
| 5,881,312 | A | * | 3/1999 | Dulong | 710/7 |
| 5,901,301 | A | * | 5/1999 | Matsuo et al. | 712/212 |
| 5,909,508 | A | * | 6/1999 | Wakatani et al. | 382/225 |
| 5,925,123 | A | * | 7/1999 | Tremblay et al. | 712/212 |
| 5,937,093 | A | * | 8/1999 | Takahashi | 382/226 |
| 5,943,493 | A | * | 8/1999 | Teich et al. | 712/228 |
| 5,953,454 | A | | 9/1999 | Iwahashi | 382/218 |
| 5,956,677 | A | * | 9/1999 | Iso | 704/254 |
| 6,012,027 | A | * | 1/2000 | Bossemeyer, Jr. | 704/243 |
| 6,108,446 | A | * | 8/2000 | Hoshen | 382/225 |
| 6,185,568 | B1 | * | 2/2001 | Douceur et al. | 707/10 |
| 6,192,336 | B1 | | 2/2001 | Manduchi et al. | 704/230 |
| 6,202,106 | B1 | * | 3/2001 | Baxter | 710/22 |
| 6,302,329 | B1 | | 10/2001 | Iwai et al. | 235/494 |
| 6,349,379 | B2 | * | 2/2002 | Gibson et al. | 712/210 |
| 6,425,067 | B1 | * | 7/2002 | Chong et al. | 711/220 |
| 6,499,083 | B1 | * | 12/2002 | Hamlin | 711/112 |
| 6,562,077 | B2 | * | 5/2003 | Bobrow et al. | 715/517 |
| 6,691,219 | B2 | * | 2/2004 | Ma et al. | 711/219 |
| 6,728,862 | B1 | * | 4/2004 | Wilson | 712/14 |
| 6,735,684 | B1 | * | 5/2004 | Shigematsu et al. | 712/10 |
| 6,745,240 | B1 | * | 6/2004 | Denman et al. | 709/220 |
| RE38,679 | E | * | 12/2004 | Matsuo et al. | 712/212 |
| 6,856,981 | B2 | * | 2/2005 | Wyschogrod et al. | 706/48 |
| 6,912,526 | B2 | * | 6/2005 | Akaboshi | 707/6 |
| 7,024,537 | B2 | * | 4/2006 | Pickett et al. | 711/217 |
| 7,046,848 | B1 | * | 5/2006 | Olcott | 382/176 |
| 7,243,165 | B2 | * | 7/2007 | Kravec et al. | 710/1 |
| 2002/0040425 | A1 | * | 4/2002 | Chaiken et al. | 712/11 |
| 2002/0083297 | A1 | * | 6/2002 | Modelski et al. | 712/18 |
| 2004/0184661 | A1 | * | 9/2004 | Kravec et al. | 382/209 |
| 2005/0281333 | A1 | * | 12/2005 | Ghanbari | 375/240.16 |

* cited by examiner

METHOD AND APPARATUS FOR PERFORMING FAST CLOSEST MATCH IN PATTERN RECOGNITION

CROSS REFERENCE TO RELATED APPLICATIONS

This application is related to the following commonly owned copending U.S. patent applications:

Ser. No. 10/393,296 entitled "Method and Apparatus For Imbedded Pattern Recognition Using Dual Alternating Pointers" filed Mar. 20, 2003, and Ser. No. 10/393,139 entitled "Method and Apparatus For Finding Repeated Substrings In Pattern Recognition" filed Mar. 20, 2003, which are hereby incorporated by reference herein.

TECHNICAL FIELD

The present invention relates in general to pattern recognition systems and in particular to pattern recognition systems where a closest match between an input pattern is determined relative to a set of reference patterns.

BACKGROUND INFORMATION

Recognizing patterns within a set of data is important in many fields, including speech recognition, image processing, seismic data, etc. Some image processors collect image data and then pre-process the data to prepare it to be correlated to reference data. Other systems, like speech recognition, are real time where the inputdata is compared in real time to reference data to recognize patterns. Once the patterns are "recognized" or matched to a reference, the system may output the reference. For example, a speech recognition system may output equivalent text to the processed speech patterns. Other systems, like biological systems may use similar techniques to determine sequences in molecular strings like DNA. If the real time data processing is too intensive for one processing unit (PU), then parallel PUs may be employed to increase computational power. Most of the processing tasks are numerically intensive as matrix and statistical techniques are used to determine a "closest" match between input data and reference data. It may be rare for the comparisons to be exact matches. While many fields use pattern recognition with similar techniques, image processing is discussed in the following simplified explanations.

Image processing and analysis may be defined as the "act of examining images for the purpose of identifying objects and judging their significance." Image analysts may study remotely sensed data and attempt, through logical processes of detecting, identifying, classifying, and measuring, to evaluate the significance of physical objects, their patterns and spatial relationship. The analyzed image data usually is converted to a digital form for analysis.

In a most generalized way, a digital pattern may be an array of numbers depicting a distribution of certain field parameters (such as reflectivity of electro-magnetic radiation, emissivity, temperature or some geophysical or topographical elevation. For example, a digital image comprises discrete picture elements called pixels. Associated with each pixel is a number (digital number, DN), that depicts the average radiance of relatively small area within a scene. The range of DN values being normally 0 to 255 in this case corresponding to 8 binary bits. The size of pixel affects the reproduction of details within the scene or image. As the pixel size is reduced, more scene detail is preserved in digital representation.

Remotely sensed data may be recorded in digital forms and then processed by computers to produce data for interpretation purposes. For example, images are usually available in two forms, photographic film or in the form of a set of digital data. Variations in image characteristics are represented as variations in brightness on photographic films or in variations in the data representing brightness. A particular part of an image reflecting more energy will appear bright while a different part of the same image reflecting less energy will appear black. These variations contain information that may be interpreted by processing.

Classification of sensed data may be used to assign corresponding levels with respect to groups with homogeneous characteristics, with the aim of discriminating multiple objects from each other within an image or other data. Classification may be used in formatting reference data and in preprocessing input data during the pattern recognition process. In the case of an image, classification may be executed on the base of spectral or spectrally defined features, such as density, texture, etc. in the feature space. It may be said that classification divides the feature space into several classes based on a decision rule.

In many cases, classification is undertaken using a computer, with the use of mathematical classification techniques. Classification may be made according to procedures, which define selections of features that allow discrimination between classes. Features used to discriminate between the classes may be established using multi-spectral and/or multi-temporal characteristics, textures, etc. Training data may be sampled in order to determine appropriate decision rules. Classification techniques such as supervised or unsupervised learning may then be selected on the basis of the training data sets. Various classification techniques are compared with the training data, so that an appropriate decision rule is selected for subsequent classification.

In image processing, depending up on the decision rule, all pixels are classified in a single class. There are two methods of pixel-by-pixel classification and per-field classification with respect to segmented areas. Popular techniques include multi-level slice classifier, minimum distance classifier, and maximum likelihood classifier. Other classifiers such as fuzzy set theory and expert systems may also be used.

Clustering is a method of grouping data with similar characteristics. Clustering may be divided into hierarchical clustering and non-hierarchical clustering. In hierarchical clustering, the similarity of a cluster is evaluated using a "distance" measure. The minimum distance between clusters will give a merged cluster after repeated procedures from a starting point of pixel-wise clusters to a final limited number of clusters. The distances to evaluate the similarity may be selected using the following methods:

Nearest neighbor method wherein the nearest neighbor with the minimum distance is used to form a new merged cluster.

Furthest neighbor method wherein the furthest neighbor with a maximum distance is used to form a new merged cluster.

Centroid method wherein the distance between the gravity centers of two clusters is evaluated for merging a new merged cluster.

Group average method wherein the root mean square distance between all pairs of data within two different clusters, is used for clustering.

Ward (root mean square) method wherein the root mean square distance between the gravity center and each member is minimized.

A minimum distance classifier is used to classify unknown data into classes that minimize the distance between the data and the class in multi-feature space. The distance is defined as an index of similarity so that the minimum distance is identical to the maximum similarity. The distances often used in this procedure of distance classification include the Euclidean distance and the Mahalanobis distance. The Euclidean distance is used in cases where the variances of the population classes are different to each other. The Euclidean distance is theoretically identical to the similarity index. A normalized Euclidean distance is proportional to the similarity index. The Mahalanobis distance is used where there is correlation between the axes in feature space.

Closest match determination is used in many applications like image processing or in image classification and is a very computationally expensive task. Hardware is needed for real-time applications but existing hardware solutions have some major limitations concerning scalability. If more integrated circuits (ICs) are used in order to increase the number of reference patterns (RPs) processed, external circuits and buses are needed. Likewise, if a number of RPs are reloaded, some extra computations may be also needed.

Typically, an Application builds a list of input patterns (IPs) using the techniques discussed. The Application then sends all the IPs to a minimum distance classifier that calculates distances (e.g., Euclidean distances) according to techniques discussed. The role of this minimum distance classifier is to process each of the IPs and to compute the distance between a particular IP and all the reference patterns (RPs). Comparison circuits are used to find a minimum distance that corresponds to one of the RPs. Each of the RPs has a specific, unique identification (ID). When the minimum distance is determined, the minimum distance classifier can output the minimum distance and the ID for the corresponding RP. For real-time applications, an important metric is the performance bandwidth (the number of IPs that can be processed per second relative to the number of desired RPs).

A common way to find a minimum distance within a reasonable time is to use a priority process. This is commonly done by scanning all the bits of the distances beginning at the most significant bit (MSB) and ending at the least significant bit (LSB). In order to do this, all the RPs have to be first loaded in each processing unit (PU) which then sequentially computes the distance to each corresponding reference pattern for each input pattern. Next, the minimum distance across all the reference patterns is determined.

There are several problems with this prior art method. To get a minimum distance, a common output bus is needed to couple all the distances to a comparison circuit to determine the minimum one. To achieve a reasonable speed, there is also a need to use a priority scheme to obtain the minimum distance. To implement this priority scheme, a common bus and merge circuitry are also needed. The merge circuitry and the bus use a great deal of area on an IC chip used to implement this function. The common bus also makes the physical scalability more complex. When more processing units (PUs) are needed than can be integrated on a single IC, a common bus must be implemented which extends outside of each IC chip. Also, to get the minimum distance with a priority scheme, several clock cycles are needed. Because one also needs common circuitry to merge together all PUs, the process is relatively slow. If one has to merge several ICs together, the corresponding circuitry may have a low clock rate because of all timing constraints of off-chip communication. Because of transmission line effects, off-chip buses typically run an order of magnitude slower than on-chip buses. Therefore, the prior art implementation of finding the minimum value is typically slower than desired. Another problem occurs if the number of RPs is greater than the number of available PUs. In this case, all minimum distances for a first set of RPs must first be determined and then the PU must be reloaded with a second set of RPs to compute all minimum distances again. Both results must be then merged together by selecting the minimum distance for a certain pattern. This must be repeated for each set of patterns and is relatively slow, causing major scalability problems with respect to the number RPs.

There is, therefore, a need for a method and an apparatus to allow improved scalability and fast closest match when processing patterns in pattern recognition systems. It is further desirable to be able to expand the number of PUs or the number of RPs without requiring major increases in circuitry or reductions in processing speed.

SUMMARY OF THE INVENTION

To find the closest match of N input patterns relative to R reference patterns, K processing units calculate distances that represent the similarity of a reference pattern to each of the N input patterns. Each of the processing units has storage and a comparison circuit that compares a recently calculated distance for a particular input pattern to the loaded reference pattern. As reference patterns are sequentially loaded, the present calculated distance replaces the stored distance if it is smaller. In this manner, the minimum distance for each input pattern is determined when the last reference pattern is loaded without additional processing. Scaling is accomplished by increasing the number of processing units without greatly increasing system complexity. More ICs may be used to increase processing units without causing high speed communication paths to extend off-chip. Increasing the number of reference patterns considered requires increasing the number of sequential steps without adding additional circuitry outside of the processing units.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
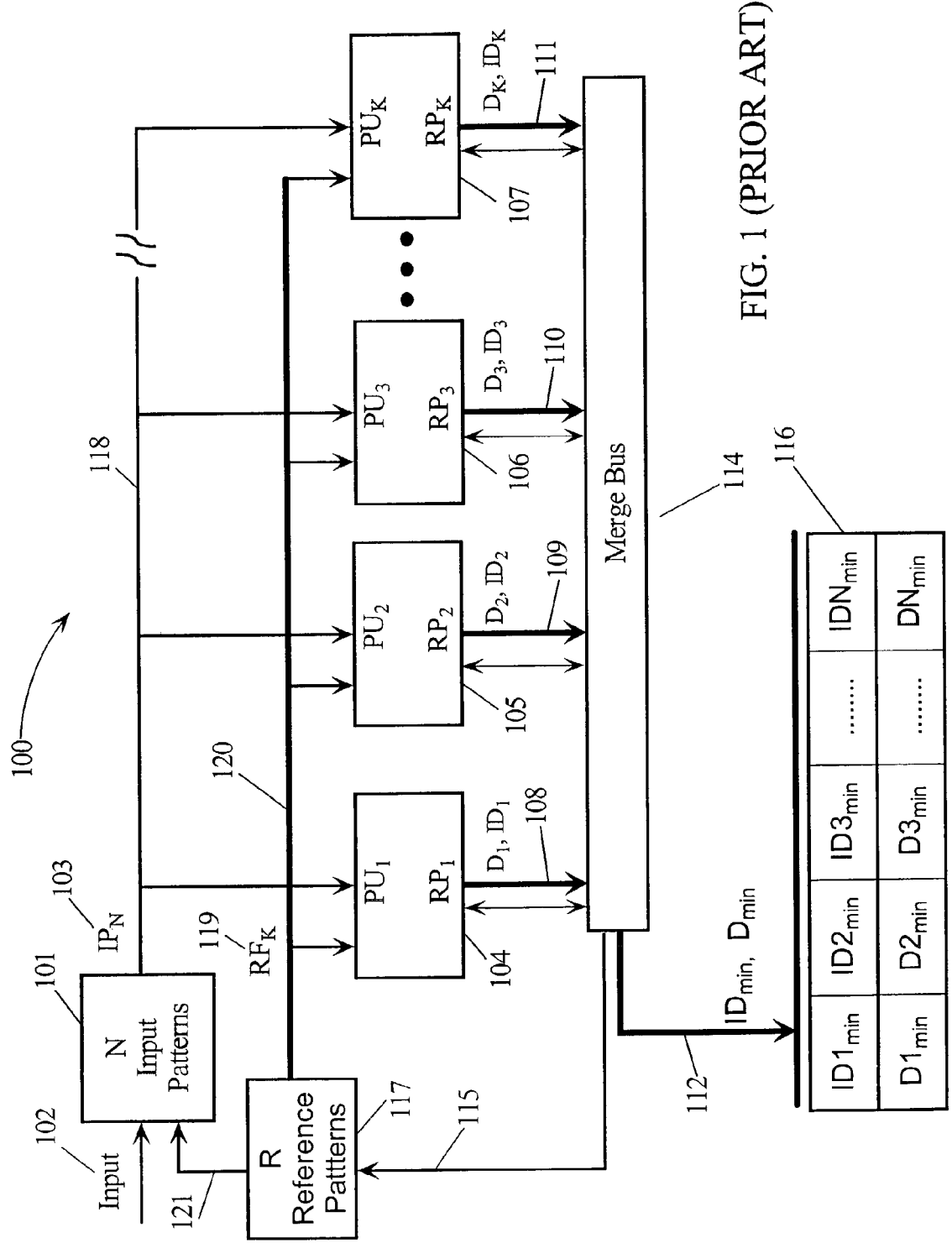
FIG. 1 is block diagram of a prior art system for comparing input patterns to reference patterns.

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views. Specific variables may be shown in italic to distinguish them from other variables.

Figure 5:
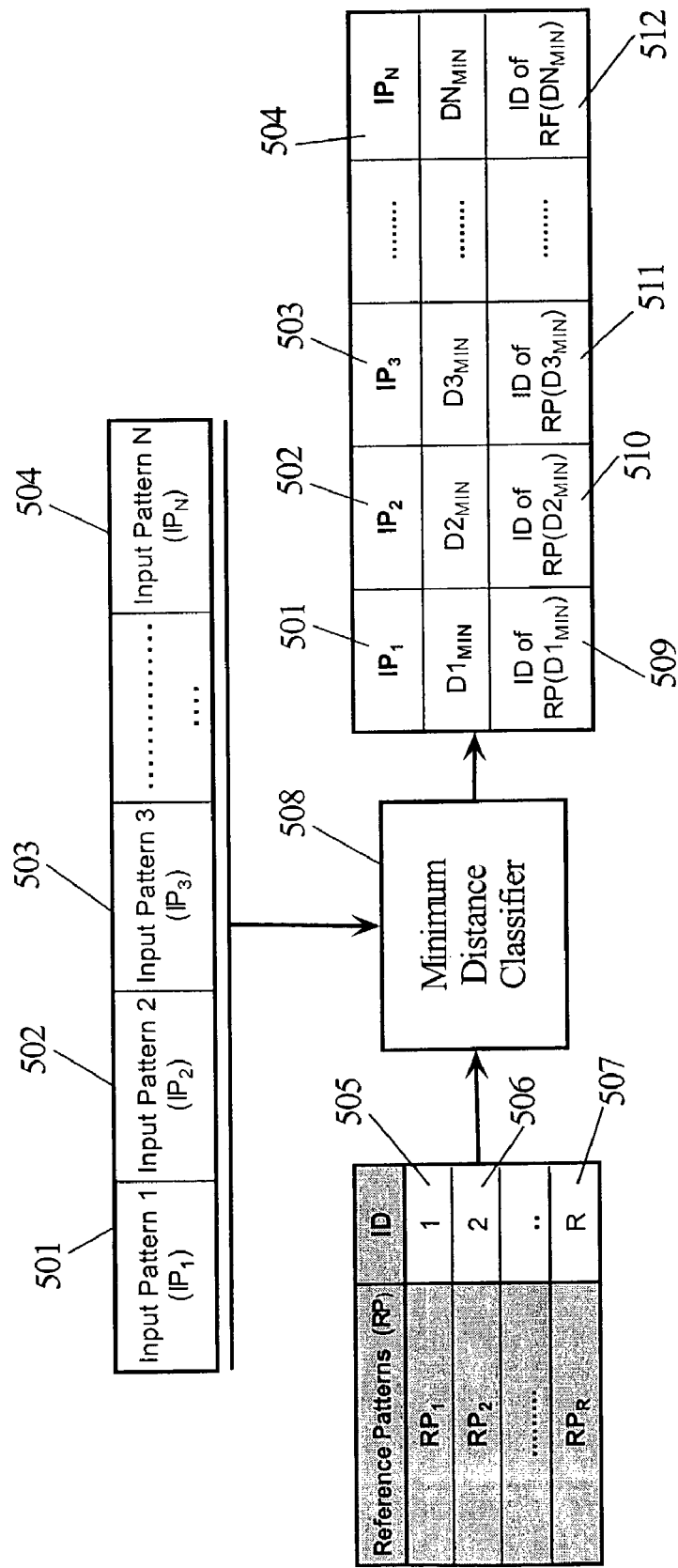
FIG. 5 illustrates the concept of minimum distance classifier in pattern matching.

FIG. 5 is a block diagram illustrating the overall concept of a minimum distance classifier. N input patterns (IPs), $IP_1$ 501-$IP_N$ 504, are compared to R reference patterns (RPs), $RP_j$ 505-$RP_R$ 507. Each of the N IPs is compared to all R RPs and a distance (D) is calculated that is a measure of how similar the IP is to each of the RPs. In general, the IPs may have a plurality of attributes which may be given values to define each IP. The RPs would likewise have the same attributes with corresponding attribute values. Each attribute of an IP would be compared in the minimum distance classifier (MDC) 508 with the like attribute in the RP and a value (defined as an attribute distance) would be calculated. A small attribute distance value may be indicative of a close similarity between the two attributes. Once all of the attribute distances have been calculated, then a determination is made as to the overall similarity between an IP and the RP when all the attribute distances are considered. A final distance would then be an indication of the overall similarity between an IP and the RP. Once an IP has been compared to all the RPs, the minimum distance may be used as an indication of which of the RPs is the "closest" match to a particular IP. Since patterns in general may be thought of a vectors with multiple dimensions, the calculations in MDC 508 may be considerable. The results from MDC 508 would be a minimum distance for each IP (e.g., $D1_{MIN}$ for $IP_1$). Likewise the IDs, ID 509-512, each corresponding to the RP that generated the minimum distance would also be determined. In this manner, the RP that is the closest match to each of the N IPs may be found.

FIG. 1 is a prior art block diagram of a system 100 for determining minimum distances for N input patterns (IPs) relative to a set of R reference patterns (RPs) using K processing units (PUs). Input 102 is processed in unit 101 to form N IPs. Input 102 could be a continuous data stream that was formatted in unit 101 so that each particular IP would be outputted ($IP_N$ 103) to each processing unit (PU) in parallel. Each $IP_N$ 103 is coupled to each one of the K processing units $PU_1$ 104, $PU_2$ 105, $PU_3$ 106, through $PU_K$ 107. In this prior art example, there is one PU for each of K RPs, $RP_1$-$RP_K$. Each PU calculates a distance $D_K$ (e.g., $PU_1$ 104 calculates $D_1$). Therefore, each time an $IP_N$ 103 is loaded into the PUs, K distances (D1-$D_K$) are calculated. At this time, it is not known which of the distances ($D_1$-$D_K$) is the minimum distance ($D_{MIN}$). To get $D_{MIN}$ within a reasonable time, merge circuits 114 are used.

Some method must be used to determine the minimum distance across the K PUs. If a common comparator is used, then all of the distances must be sent to the common comparator on a bus which would take R/K bus cycles along with the time to determine a minimum distance in the comparator. To eliminate the bus, the distance and the corresponding ID in $PU_K$ may be coupled to the $PU_{K-1}$. The minimum distance between these two processors and its corresponding ID may then be sent to the next PU in a daisy chain fashion until the distance in $PU_1$ is compared and the minimum distance and its corresponding ID are determined for the K RPs. However, this method again requires K sequential comparisons and R/K loads of RPs to determine the minimum distance for each of the N IPs.

In another prior art method, a dichotomy algorithm is used across all the output bits of all the K PUs. In this merge method, a specific bit for all the distances is examined during the same bus cycle starting with the most significant bit (MSB) using an AND logic function. All the PUs couple their MSB on a common bus whose state is a logic one if all the MSBs are a logic one and a logic zero if any MSB is zero. If the bus level is a logic zero, then there is at least one PU with a MSB which is a logic zero. In this case, all PUs whose MSB is a logic one are deselected from the process. The next bit is then considered until the least significant bit (LSB) is reached. At this time, there should be only one PU that is not selected and this PU has the minimum distance. The minimum distance and the corresponding ID used to calculate the minimum distance may be outputted to identify the RP that is the closest match to an IP. In the rare case that more than one PU is not selected after the process above for determining the minimum distance, the same process is repeated using the IDs of the multiple minimum distances. Since the IDs correspond to different reference patterns, they will not be the same. This process would, by definition, select as the closest match the reference pattern with the minimum distance value and the lowest ID value. Therefore, for each set of K PUs, it will take two sets of AND cycles; one set to determine the one or more minimum distances and one set to determine the lowest ID to distinguish between multiple minimum distances.

This process takes one bus AND cycle for each bit used to define a distance. The problem with this merge process is that it requires a R PUs, one for each reference pattern or if there are only K PUs, then this time consuming process must be repeated R/K times. Likewise, a common bus is needed to make the logic bus AND between all bits. If a common bus is not used, it would require a logic AND tree across all the bits which would be quite large if there is a large number of PUs. The common bus must couple to all the PUs and this takes considerable circuit area and presents wiring problems. This solution is also not very scalable along the variable R because of the bus wiring and the possibility that the number of PUs will require a multiple chip implementation.

In the following "*" represents the multiplication operator. A cycle in system 100 comprises the following processing times:

Tk—the time to load K PUs with the K reference patterns

Tk—the time to load K PUs with an IP

Tm—the time merge R distances to determine a $DN_{MIN}$ and corresponding ID of the reference pattern generating $DN_{MIN}$.

The total time to process N IPs relative to R RPs is given by the following:
(1) The K RPs are loaded into the K PUs in parallel taking K*Tk time periods.
(2) The N IPs are sequentially loaded into the K PUs in parallel taking N*Tk time periods.

The steps 1-2 are repeated for all R RPs giving (R/K) *N*Tk time periods for loading the IPs
(3) It takes R/K merge cycles Tm to find a minimum distance for each ID relative to R PRs using K PUs. To find N minimum distances and corresponding IDs takes (R/K)*N*Tm time periods.

$$T\text{total}(100)=N*(R/K)*Tk)+R*Tk+(R/K)*N*Tm$$

One of the problems with this prior art system is that the merge time Tm gets multiplied the number of input patterns N. Also if one wants to increase the number of target RPs without increasing processing time, then additional PUs must be added which further increases the total merge cycle time. In the dichotomy system, a bus couples all the K PUs to determine, using a logic AND process, the PU that has the minimum distance. Bits in the calculated distances are compared one at a time so some communication between PUs must be maintained to synchronize this operation. To output the ID of the closest match RP also requires a data bus coupling the PUs so ID values of the closest matches can be accumulated.

Figure 2:
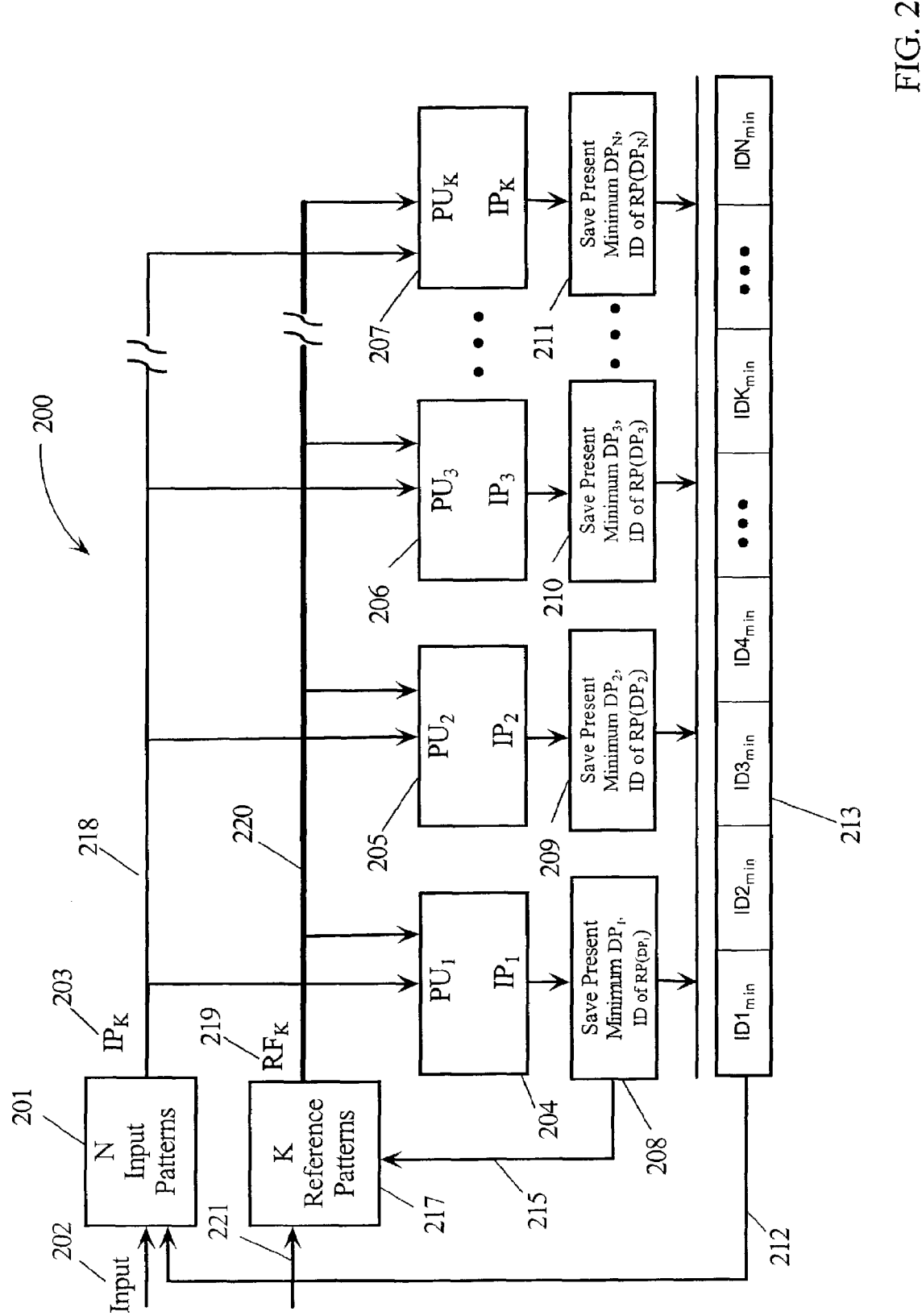
FIG. 2 is a block diagram of a system for comparing input patterns to reference patterns according to embodiments of the present invention.

FIG. 2 is a block diagram of a system 200 utilizing embodiments of the present invention. System 200 is different from system 100 in that IPs are loaded into the PUs in parallel and the RPs are indexed. To compare system 200 to system 100, the N IPs are again compared to R RPs using K PUs. Input 202 is formatted in unit 201 into N IPs. K of the IPs ($IP_K$ 203) are coupled to K PUs (e.g., $PU_1$ 204-$PU_K$ 207), one IP for each PU (e.g., $PU_1$ receives $IP_1$). Once the PUs are loaded with the IPs, the first of the R RPs ($RP_1$) is loaded in parallel into each of the K PUs. Each PU then determines the corresponding "present" distance (DP) of $RP_1$ relative to its loaded $IP_K$. Therefore, these intermediate present distances ($DP_1$-$DP_K$) of $RP_1$ relative to $IP_1$-$IP_K$ are calculated in parallel. Each of the present distances ($DP_1$-$DP_K$) is the minimum distance for each IP, known after considering $RP_1$-$RP_P$, where index P is the present of R RPs. After each distance calculation, the present DP is compared to a saved DP (saved in registers 208-211) to determine which has the lowest value. The saved DP is then updated to the new calculated DP if the new DP has a lower value. In this manner, embodiments of the present invention always have the minimum distance $D_{MIN}$ for each IP saved in one of the registers 208-211. Each $ID_{MIN}$ corresponding to the RP used to determine the saved $D_{MIN}$ is also save in one of the registers 208-211.

After each DP has been calculated, index 215 may signal unit 217 to output the next sequential $RP_P$ until $RP_R$ is reached. After $RP_K$ is reached, the $D_{MIN}$ values saved in registers 208-211 may be transferred to registers 213 if N is greater than K. Signal 212 would then signal unit 201 to output the next set of IPS ($IP_{K+1}$-$IP_{2k+1}$). With buffering, it is very easy to partition or normalize the input into sets of K IPs and repeat the process until the desired N IPs have been processed. For the comparison of system 200 to system 100, the relationship between N and K can be expressed by the ratio N/K. If N is greater than K, then the process above would be repeated N/K times to correspond to system 100. It is also assumed for this comparison that N is either greater than or equal to K. If it was less than K, then the number of PUs needed in system 200 would obviously be less than the number needed for system 100.

The total time to process N IPs relative to R RPs is given by the following:
(1) K IPs are loaded into the K PUs in parallel taking Tk time period. This process is repeated N/K times taking N*Tk time periods.
(2) The K RPs are sequentially loaded into the K PUs. This process is repeated R/K taking R*Tk time periods.
(3) R distances are calculated for each of K IPs relative to each of the R RPs in parallel taking a Td time period. This process is repeated N times taking N*Td time periods.
(4) Since there is no need merge the distances to determine a minimum distance there is no common bus and there is no time period Tm.
(5) After K RPs have been loaded all K minimum ID values ($ID_{MIN}$) and K $D_{MIN}$ values may be serially transferred to registers 213 in a register time Tr. This process is repeated N/K until times taking 2*N*Tr time periods.

The time to determine $D_{MIN}$ for each of the N IPs is done at the same time as determining the present distances so there is no additional time periods.

Adding up all the time periods results in total time to process N IPs relative to R RPs as follows:

$$T\text{total}(200)=N*Tk+(R*Tk)+(2*N*Tr).$$

In system 200, each PU is loaded with a different IP rather than a different RP. The PUs then sequentially determine distances of its IP with respect to each indexed RP. Once K IPs are loaded into each $PU_1$ 204-$PU_K$ 207, each PU calculates a distance corresponding to its IP and the indexed RP. Each time a PU calculates a distance, it updates its stored present DP in units 208-211 with the lower value DP so that $DP_1$-$DP_K$ are always at a present minimum value. In this manner, when all the R RPs have been cycled through, the minimum distances for IPs will have been determined without the requirement to "merge" the results to determine a minimum distance. After the R RPs have been processed, the K $ID_{MIN}$ values and the corresponding K $D_{MIN}$ values may be stored in register 213. If N is greater than K, this process is repeated N/K times until the N $D_{MIN}$ and their corresponding N $ID_{MIN}$ values have been determined. Since the minimum distances are all determined continuously while the distances are calculated, there is no additional time Tm required as was the case in the prior art of FIG. 1. Comparing the total times of the two systems illustrates the advantages of the present invention.

$$\text{System } 100\, T\text{total}(100)=N*(R/K)*Tk)+R*Tk+(R/K)*N*Tm)$$

$$\text{System } 200\, T\text{total}(200)=N*Tk+(R*Tk)+2*(N*Tr)$$

The time Tm is the time required to merge K distances that were calculated by comparing each IP to the corresponding K RPs. As R increases then this time would therefore increase in direct proportion to K provided the merge circuitry and the corresponding bus can be contained on one IC. This is directly related to the number of PUs that can be contained on one IC. In system 100, PUs added to increase speed of processing may require more than one IC and the merge circuitry will have to communicated across IC boundaries which results in longer times.

Figure 3:
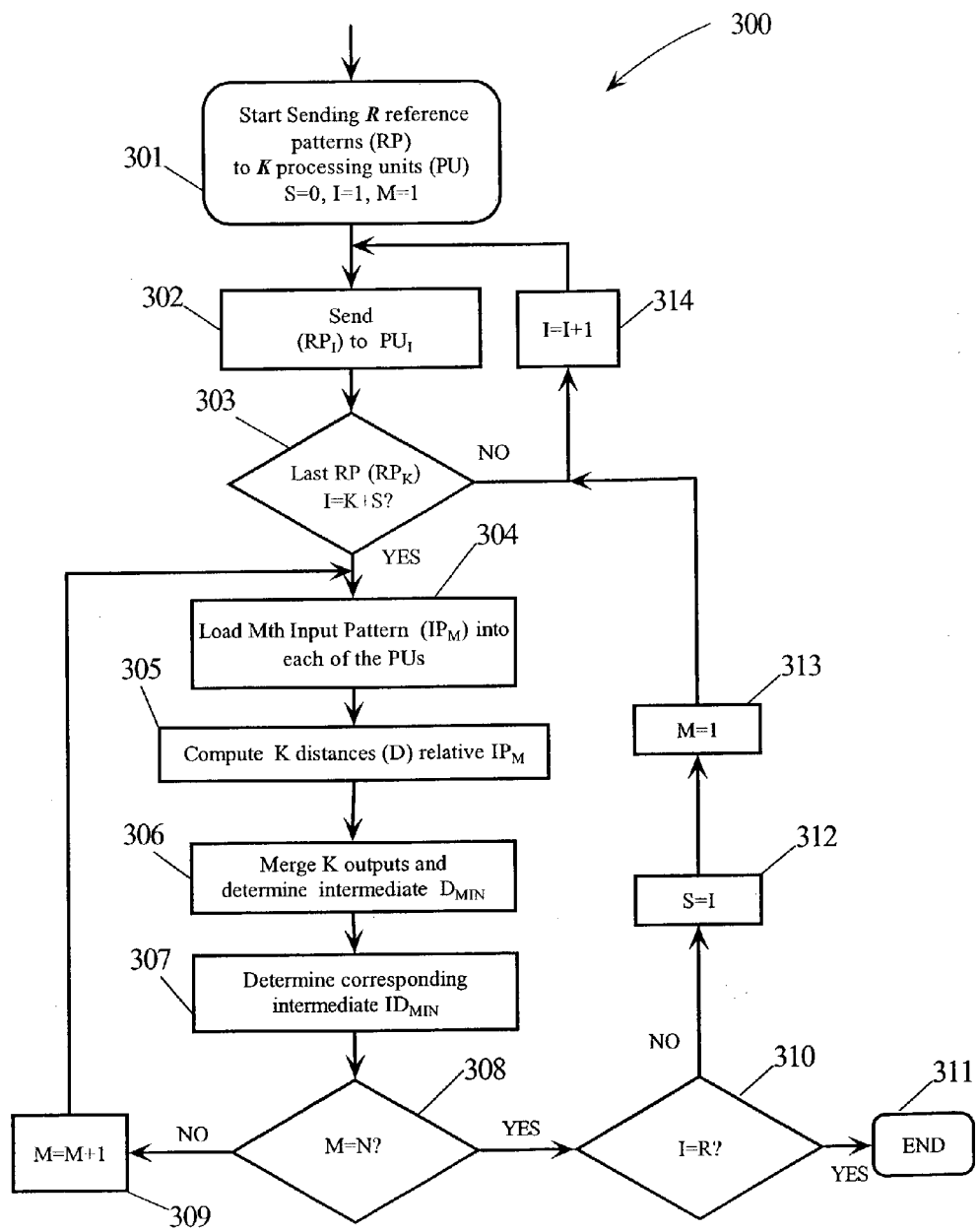
FIG. 3 is a flow diagram of a method for determining the closest match between N input patterns relative to R reference patterns using K processing units.

FIG. 3 is a flow chart of a method 300 used to determine N $D_{MIN}$ and corresponding N IDs for N IPs across R RPs using K PUs. In step 301, indexes S, I, and M are initialized. In step 302, the K RPs are loaded into the PUs beginning at $RP_1$. In step 303, a test is done to determine if the last $RP_K$ in a set of K RPs has been loaded. If the result of the test in step 303 is NO, then the loading of the PUs is not complete. Therefore, in step 314, the index I is incremented by one and step 302 is executed again. This continues until the result of the test in step 303 is YES. When index I is equal to K, 2K, 3K, etc. (determined by index S), then in step 304 the first one of N IPs is loaded into all K PUs. In step 305, the distances of the IP is determined relative to all of the K loaded RPs. In step 306, these distances are merged to determine an intermediate minimum distance. Since in general K is less than R, remaining (R−K) RPs must be loaded and distances calculated to finally arrive at the $D1_{MIN}$ for $IP_1$, In step 307, the corresponding ID for the present DP is determined. In step 308, a test is done to determine if all N of the IPs have been processed by comparing index M to the number N. Index M was initially set to one in step 301. If the result of the test in step 308 is NO, then M is incremented by one in step 309 and branch is taken to step 304 to load the Mth IP.

If all the input patterns have been processed, then in step 310 a test is done to determine if all R RPs have been compared (to each of the N IPs). This is done by comparing the index I with the number R. If the result of the test in step 310 is YES, then in step 311 the process is ended. At this time the calculated results may be outputted. If the result of the test in step 310 is NO, then in step 312 the index I is set to S and in step 313 the index M is set back to one. A branch is then taken to step 314 when I is incremented by one to load the next K RPs.

Figure 4:
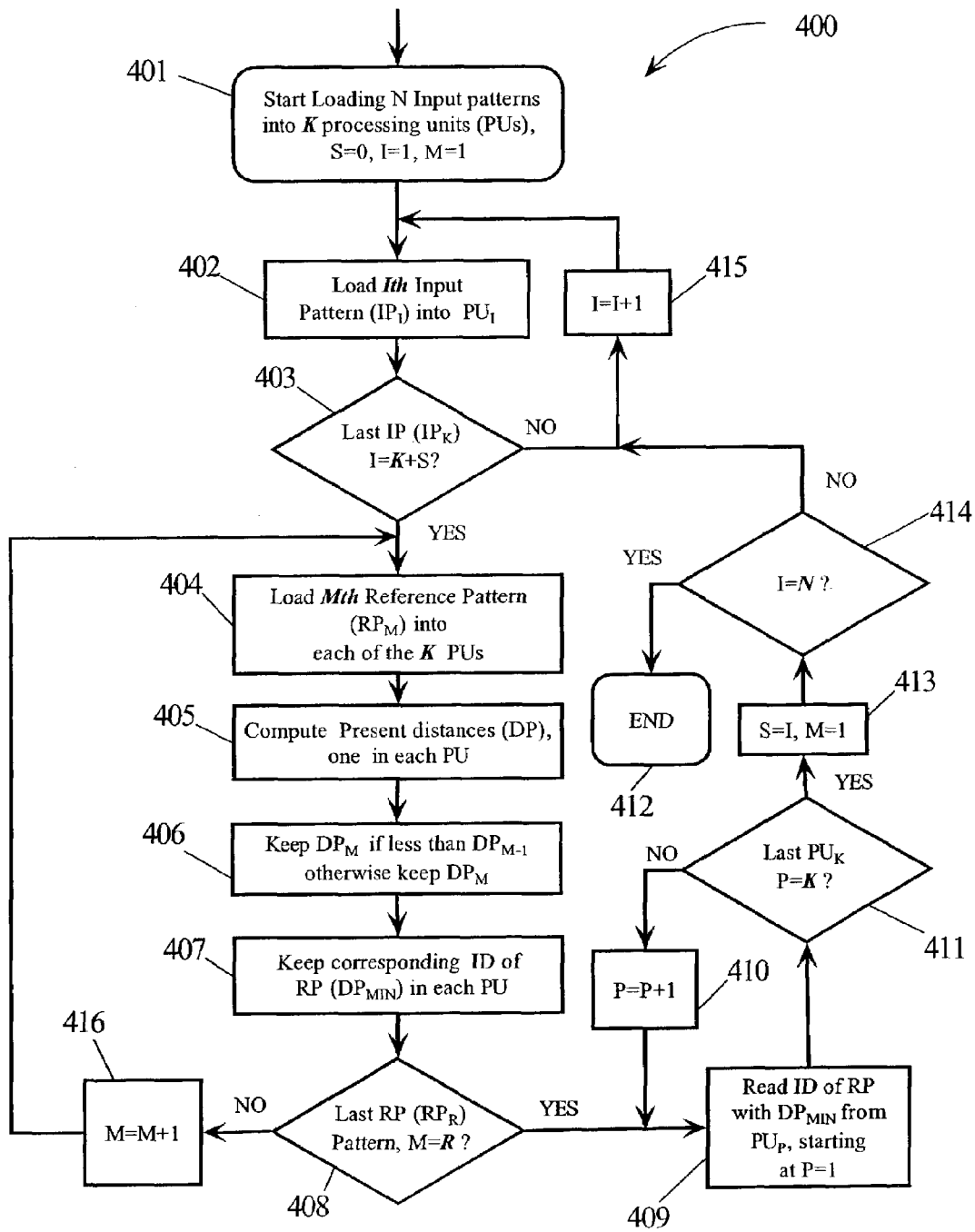
FIG. 4 is a flow diagram of another method for determining the closest match between N input patterns relative to R reference patterns using K processing units.

FIG. 4 is a flow chart of a method 400 used to determine N $D_{MIN}$ and N $ID_{MIN}$ across R RPs using K PUs according to embodiments of the present invention. In step 401, indexes S, I, and M are set to their initial values of 0, 1, and 1 respectively. In step 402, the input pattern corresponding to the index I is loaded into the PU corresponding to the index I (e.g., $IP_1$ is loaded into $PU_1$). In step 403, a test is done to determine if the last input pattern has been loaded into the last PU (e.g., has $IP_K$ been loaded into $PU_K$). If the result of the test in step 403 is NO, then index I is incremented by one in step 415 and then step 402 is repeated. If the result of the test in step 403 is YES, then in step 404 the RP corresponding to the index M is loaded into each of the K PUs. In step 405, the present distance DP is calculated in each of the K PUs. In step 406, a determination is made if the new DP has a value less than the previously stored DP. If this is the first distance calculated, it is stored as DP. The stored DP is the minimum distance relative to the preceding M reference patterns that have been processed. In step 407, the ID of the reference pattern corresponding to the saved DP is also stored. This identifies which of the M reference patterns is thus far the closest match to each the K input patterns. In step 408, a test is done to determine if all the R RPs have been processed by testing index M. If the result of the test in step 408 is NO, then all the RPs have not been processed and in step 416 the value of index M is incremented by one and then step 404 is again executed. This loop continues until all the RPs have been processed.

If the result of the test in step 408 is YES, then all of the R reference patterns have been processed and in steps 409-411 the $ID_{MIN}$ values are read. These $ID_{MIN}$ values identify the corresponding RPs that are the closest match to each of the K input patterns in the K PUs. After the last ID value is read, the index S is set to the value of the index I and the index M is set to one. In step 414, a test is done to determine if all of the N input patterns have been processed. If they have been processed, then in step 412 the process is ended. If all the input patterns have not been processed, the value of index I is not equal to N and a branch is taken back to step 415 where I is incremented by one and then step 402 is again executed. When the result of the test in step 414 is YES, then N $ID_{MIN}$ values have been determined identifying which of the R reference patterns is the closest match to each of the N IPs without any additional processing.

Figure 6:
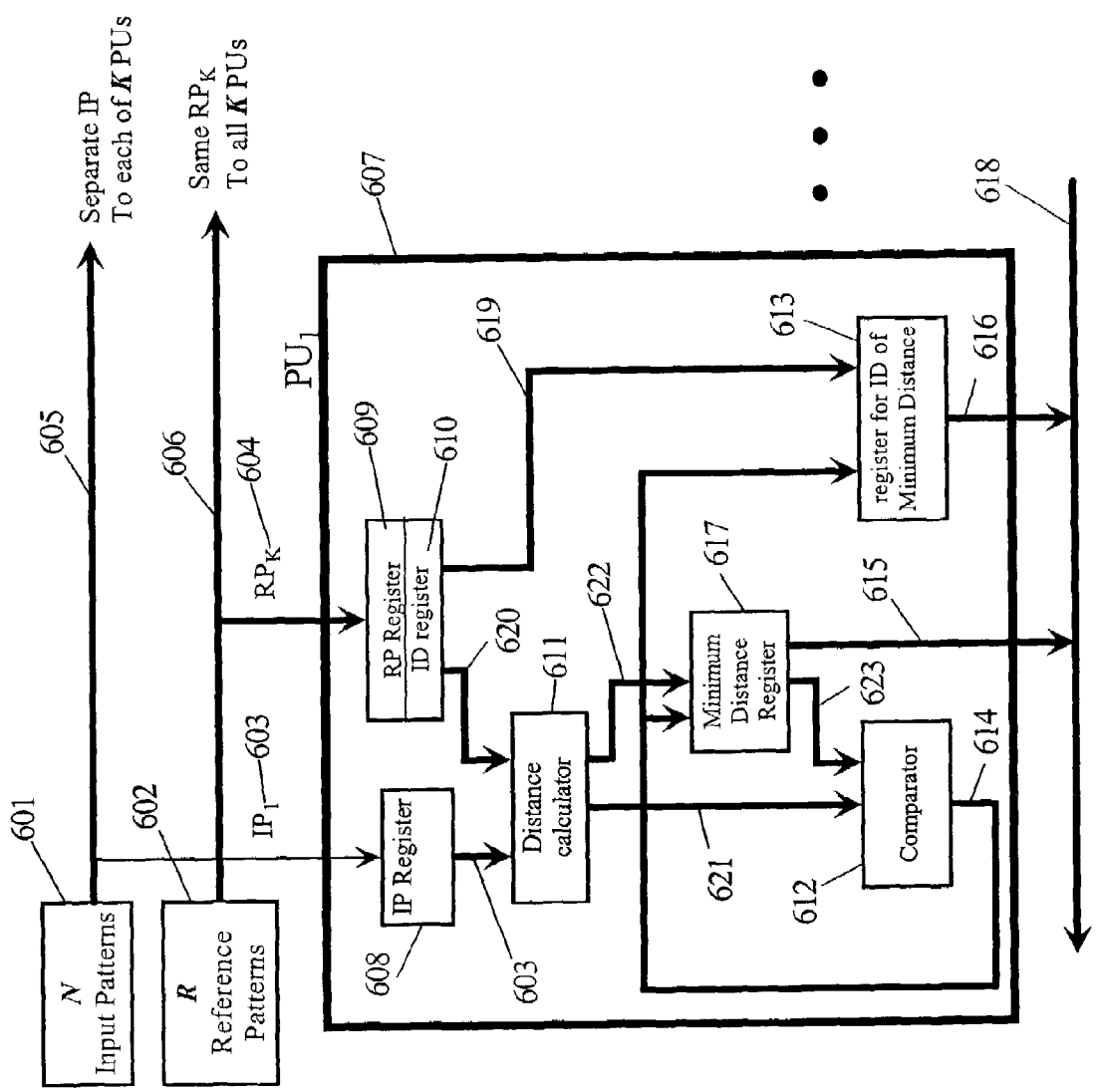
FIG. 6 is a block diagram of circuitry within a processing unit according to embodiments of the present invention.

FIG. 6 is a block diagram of details of a PU (e.g., $PU_K$) according to embodiments of the present invention. One of K of the N IPs in unit 601 are coupled to each of the K PUs using bus 605. Since a different one of the IPs are loaded to each of the PUs before matching starts, the loading does not add much to processing time. A same one of the R PRs are coupled to the PUs using a connection 606. Since the same RP is going to each PU, connection 606 is a multi-drop net. Since each PU is essentially the same, only one PU (e.g., $PU_1$) needs to be explained in detail.

$IP_1$ is coupled to IP register 608 in $PU_1$. The $RP_K$ is coupled to RP register 609 and its corresponding ID is coupled to ID register 610. Distance calculator 611 determines how similar $IP_1$ is to an $RP_K$ by calculating a distance 621. Distance 621 is compared (in comparator 612) to a present minimum distance ($D_M$ 623) presently stored in $D_M$ register 617. $D_M$ register 617 may be initially set to a maximum value so that the first calculated distance becomes $D_M$ 623. The output 614 of comparator 612 is a logic one if the present calculated distance is less than the present $D_M$ 623 and a logic zero if it is greater than or equal to the present $D_M$ 623. If output 614 is a logic one, then the present distance 622 replaces present $D_M$ 623 as the new stored $D_M$ 615. The ID 619 of the RP used to calculate the present distance 622 is coupled to register 613 which stores the $ID_M$ 616 of the stored $D_M$ 615. ID 619 updates the stored $ID_M$ 616 each time comparator output 614 is a logic one after a compare cycle. Therefore, stored $D_M$ 615 may sent over bus 618 and the ID of stored $D_M$ 615 is outputted as $ID_M$ 616. In this embodiment, $ID_M$ 616 and $D_M$ 615 are outputted only after R reference patterns have been processed, therefore, bus 618 may not have to operate at a high speed.

Figure 7:
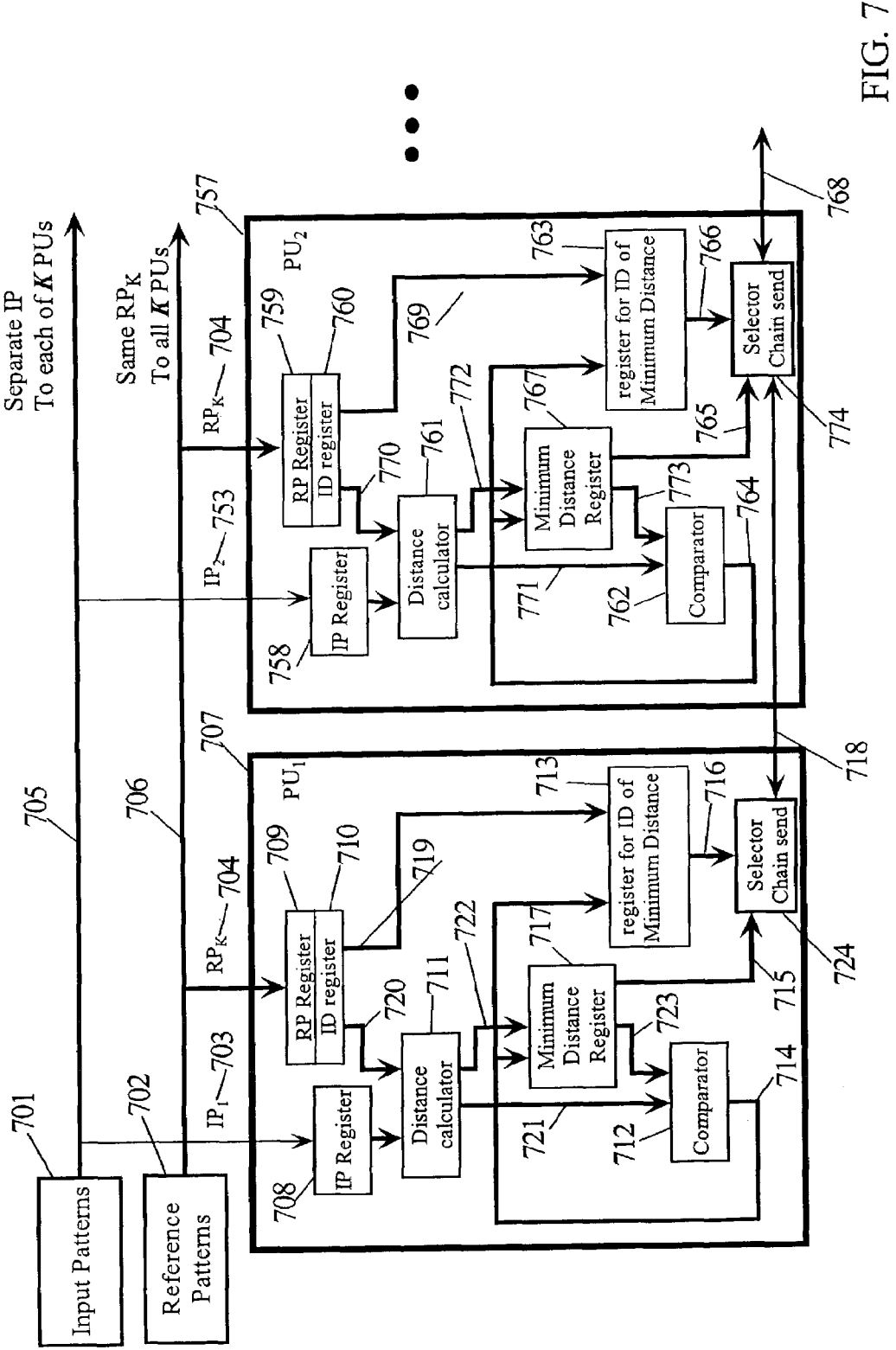
FIG. 7 is a block diagram of multiple processing units according to embodiments of the present invention.

FIG. 7 is a block diagram of another embodiment of the present invention. One each of K of the N IPs in unit 701 are coupled to each of the K PUs using bus 705. A same one of the R PRs in unit 702 is coupled to the PUs using a connection 706. Since the same RP is going to each PU, connection 706 is a multi-drop net. Since each PU is essentially the same, only two PUs (e.g., $PU_1$ and $PU_1$) need to be explained in detail. $IP_1$ is coupled to IP register 708. The $RP_K$ is coupled to RP register 709 and its corresponding ID is coupled to ID register 710. Distance calculator 711 determines how similar $IP_1$ is to an $RP_K$ by calculating a distance 721. Distance 721 is compared to a present minimum distance ($D_M$ 723) in $D_M$ register 717. $D_M$ register 717 may be initially set to a maximum value so that the first calculated distance becomes $D_M$ 723. The output 714 of comparator 712 is a logic one if the present calculated distance is less than the present $D_M$ 723 and a logic zero if it is greater than or equal to the present $D_M$ 723. If output 714 is a logic one, then the present distance 722 replaces present $D_M$ 723 as the new stored $D_M$ 715. The ID 719 of the RP used to calculate the present distance 722 is coupled to register 713 which stores the $ID_M$ 716 of the stored $D_M$ 715.

ID 719 updates the stored $ID_M$ 716 each time comparator output 714 is a logic one after a compare cycle.

A second $PU_2$ 757 processes $IP_2$ against all the R RPs to find the closest match. While $PU_2$ 757 is very similar to $PU_1$ 707, it is added to show how this embodiment outputs the closest match ID and minimum distance if desired. $IP_2$ 753 is coupled to IP register 758. $RP_K$ 704 is coupled to RP register 759 and its corresponding ID is coupled to ID register 760. Distance calculator 761 determines how similar $IP_2$ is to an $RP_K$ by calculating a distance 771. Distance 771 is compared to a present minimum distance ($D_M$ 773) in $D_M$ register 767. $D_M$ register 767 may be initially set to a maximum value so that the first calculated distance becomes $D_M$ 773. The output 764 of comparator 762 is a logic one if the present calculated distance is less than the present $D_M$ 773 and a logic zero if it is greater than or equal to the present $D_M$ 773. If output 764 is a logic one, then the present distance 772 replaces present $D_M$ 773 as the new stored $D_M$ 765. The ID 769 of the RP used to calculate the present distance 772 is coupled to register 763 which stores the $ID_M$ 766 of the stored $D_M$ 765. ID 769 updates the stored $ID_M$ 766 each time comparator output 764 is a logic one after a compare cycle.

$D_M$ 715 and $ID_M$ 716 are coupled to a selector circuit 724 which has circuitry for doing a chain send when coupled to the next selector circuit 774. Selector circuit 724 receives a send signal over connection 718 and it then alternately sends $D_M$ 715 and $ID_M$ 716 to selector circuit 774. Selector circuit 774 would have sent $D_M$ 765 and $ID_M$ 766 in a like manner over connection 768 to the next selector circuit in $PU_3$ (not shown). The direction of read out, from $PU_1$ to $PU_K$ as shown, is arbitrary. Using this method the output bus is eliminated and outputs need only be coupled from one PU to the next in a daisy chain fashion. Adding PUs only affects the wiring to an adjacent PU.

Figure 8:
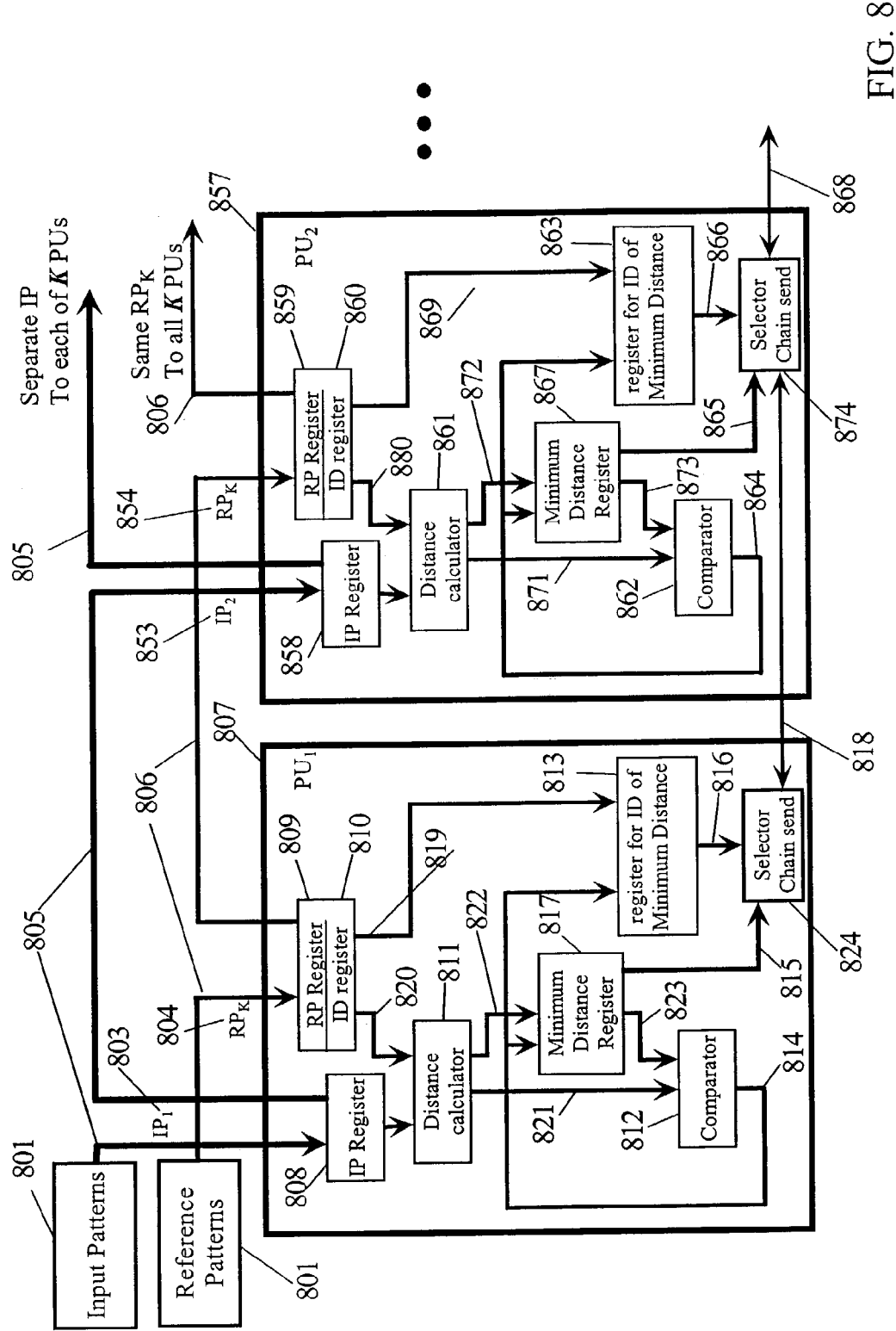
FIG. 8 is a block diagram of multiple processing units according to another embodiment of the present invention.

FIG. 8 is a block diagram of another embodiment of the present invention where the bus coupling the IPs and the RPs to the PUs comprises a daisy chain bus (DB) structure. One each of K of the N IPs in unit 801 are coupled to each of the K PUs using DB 805. DB 805 has control signals that signal the first $IP_1$ 803 to be loaded into IP register 808. The next $IP_2$ 853 is forwarded from IP register 808 to IP register 858. This process is continued until a separate one of K IPs is loaded into each of the K PUs. A same one of the R RPs and corresponding ID in unit 802 is coupled to the PUs using a DB 806. DB 806 has control signals for signaling for an $RP_K$ 804 to be loaded into RP register 809 and its corresponding ID to ID register 810. RP register 809 has circuitry for forwarding $RP_K$ 804 and its corresponding ID to RP register 859 and ID register 860 in $PU_2$ 857. This process is repeated using DB 805 coupled to the other K PUs.

FIG. 8 is similar to FIG. 7 except for DB 805 and 806, however the explanation is repeated for clarity. Since each PU is essentially the same, only two PUs (e.g., $PU_1$ and $PU_1$) need to be explained in detail. $IP_1$ is coupled to IP register 808. An $RP_K$ is coupled to RP register 809 and its corresponding ID is coupled to ID register 810. Distance calculator 811 determines how similar $IP_1$ is to an $RP_K$ by calculating a distance 821. Distance 821 is compared to a present minimum distance ($D_M$ 823) in $D_M$ register 817. $D_M$ register 817 may be initially set to a maximum value so that the first calculated distance becomes $D_M$ 823. The output 814 of comparator 812 is a logic one if the present calculated distance is less than the present $D_M$ 823 and a logic zero if it is greater than or equal to the present $D_M$ 823. If output 814 is a logic one, then the present distance 822 replaces present $D_M$ 823 as the new stored $D_M$ 815. The ID 819 of the RP used to calculate the present distance 822 is coupled to register 813 which stores the $ID_M$ 816 of the stored $D_M$ 815. ID 819 updates the stored $ID_M$ 816 each time comparator output 814 is a logic one after a compare cycle.

A second $PU_2$ 857 processes $IP_2$ against all the R RPs to find the closest match. While $PU_2$ 857 is very similar to $PU_1$ 807, it is added to show how this embodiment outputs the closest match ID and minimum distance if desired. $IP_2$ 853 is coupled to IP register 858. The $RP_K$ 854 is coupled to RP register 859 and its corresponding ID is coupled to ID register 860. Distance calculator 861 determines how similar $IP_2$ is to an $RP_K$ by calculating a distance 871. Distance 871 is compared to a present minimum distance ($D_M$ 873) in $D_M$ register 867. $D_M$ register 867 may be initially set to a maximum value so that the first calculated distance becomes $D_M$ 873. The output 864 of comparator 862 is a logic one if the present calculated distance is less than the present $D_M$ 873 and a logic zero if it is greater than or equal to the present $D_M$ 873. If output 864 is a logic one, then the present distance 872 replaces present $D_M$ 873 as the new stored $D_M$ 865. The ID 869 of the RP used to calculate the present distance 872 is coupled to register 863 which stores the $ID_M$ 866 of the stored $D_M$ 865. ID 869 updates the stored $ID_M$ 866 each time comparator output 864 is a logic one after a compare cycle.

$D_M$ 815 and $ID_M$ 816 are coupled to a selector circuit 824 which has circuitry for doing a chain send when coupled to the next selector circuit 874. Selector circuit 824 receives a send signal over connection 818 and it then alternately sends $D_M$ 815 and $ID_M$ 816 to selector circuit 874. Selector circuit 874 would have sent $D_M$ 865 and $ID_M$ 866 in a like manner over connection 868 to the next selector circuit in $PU_3$ (not shown). The direction of read out, from $PU_1$ to $PU_K$ as shown, is arbitrary. Using this method the output bus is eliminated and outputs need only be coupled from one PU to the next in a daisy chain fashion. Adding PUs only affects the wiring to an adjacent PU.

Although the present invention and its advantages have been described in detail, it should be understood that various changes, substitutions and alterations can be made herein without departing from the spirit and scope of the invention as defined by the appended claims.

What is claimed is:

1. A method for finding a closest match of each of a plurality of N input patterns relative to a plurality of R reference patterns using a plurality of K processing units comprising:

(a) loading a first input pattern into a first processing unit and a second input pattern into a second processing unit;

(b) sending one of said R reference patterns as a selected reference pattern to said first and second processing units;

(c) calculating a first distance in said first processing unit, said first distance representing a similarity of said selected reference pattern to said first input pattern;

(d) calculating a second distance in said second processing unit, said second distance representing a similarity of said selected reference pattern to said second input pattern;

(e) saving said first distance as a present minimum first distance and saving a first identification corresponding to said selected reference pattern used to calculate said present minimum first distance if said first distance is smaller than a stored previous present minimum first distance;

(f) saving said second distance as a present minimum second distance and saving a second identification corresponding to said selected reference pattern used to calculate said present minimum second distance if said second distance is smaller than a stored previous present minimum second distance;

(g) repeating steps (b)-(f) until all of said R reference patterns have been loaded, wherein said present first minimum distance is a final first minimum distance of said first input pattern relative to said R reference patterns and said first identification identifies which of said R reference patterns is a closest match to said first input pattern, and said present second minimum distance is a final second minimum distance of said second input pattern relative to said R reference patterns and said second identification identifies which of said R reference patterns is a closest match to said second input pattern; and sending said first identification from a first selection circuit in said first processing unit to a second selection circuit in said second processing unit after said R reference patterns have been processed, wherein said first selection circuit selects between said final first minimum distance and said first identification.

2. The method of claim 1, further including the step of sending said second identification from said second selection circuit in said second processing unit to a third selection circuit in a third processing unit after said R reference patterns have been processed, wherein said second selection circuit selects between said final second minimum distance and said second identification.

3. A method for finding a closest match of each of a plurality of N input patterns relative to a plurality of R reference patterns using a plurality of K processing units comprising:

(a) calculating a first distance between a first input pattern and a selected reference pattern in a first processing unit, said first distance representing a similarity of said selected reference pattern to said first input pattern (b) calculating a second distance between a second input pattern and said selected reference pattern in a second processing unit, said second distance representing a similarity of said selected reference pattern to said second input pattern;

(c) saving said first distance as a present minimum first distance and saving a first identification corresponding to said selected reference pattern used to calculate said present minimum first distance if said first distance is smaller than a stored previous present minimum first distance;

(d) saving said second distance as a present minimum second distance and saving a second identification corresponding to said selected reference pattern used to calculate said present minimum second distance if said second distance is smaller than a stored previous present minimum second distance;

(e) repeating steps (b)-(d) until all of said R reference patterns have been processed, wherein said present first minimum distance is a final first minimum distance of said first input pattern relative to said R reference patterns and said first identification identifies which of said R reference patterns is a closest match to said first input pattern, and said present second minimum distance is a final second minimum distance of said second input pattern relative to said R reference patterns and said second identification identifies which of said R reference patterns is a closest match to said second input pattern; and sending said first identification from a first selection circuit in said first processing unit to a second selection circuit in said second processing unit after said R reference patterns have been processed, wherein said first selection circuit selects between said final first minimum distance and said first identification.

4. The method of claim 3, further including the step of sending said second identification from said second selection circuit in said second processing unit to a third selection circuit in a third processing unit after said R reference patterns have been processed, wherein said second selection circuit selects between said final second minimum distance and said second identification.

* * * * *